(12) United States Patent
DiMambro et al.

(10) Patent No.: US 7,512,128 B2
(45) Date of Patent: Mar. 31, 2009

(54) SYSTEM AND METHOD FOR A MULTI-PACKET DATA LINK LAYER DATA TRANSMISSION

(75) Inventors: Francesco R. DiMambro, San Jose, CA (US); Cahya Adi Masputra, Millbrae, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1054 days.

(21) Appl. No.: 10/434,810

(22) Filed: May 9, 2003

(65) Prior Publication Data
US 2003/0231659 A1    Dec. 18, 2003

Related U.S. Application Data

(63) Continuation-in-part of application No. 10/170,919, filed on Jun. 12, 2002.

(51) Int. Cl.
*H04L 12/28* (2006.01)
(52) U.S. Cl. .................... 370/393; 370/473; 370/474
(58) Field of Classification Search ............ 370/473, 370/393, 474; 709/250
See application file for complete search history.

(56) References Cited

U.S. PATENT DOCUMENTS

| 6,708,233 | B1* | 3/2004 | Fuller et al. ................... 710/22 |
| 2001/0023460 | A1* | 9/2001 | Boucher et al. ............ 709/250 |
| 2004/0064589 | A1* | 4/2004 | Boucher et al. ............ 709/250 |

* cited by examiner

*Primary Examiner*—Seema S Rao
*Assistant Examiner*—Sai-Ming Chan
(74) *Attorney, Agent, or Firm*—Martine Penilla & Gencarella, LLP (57) ABSTRACT

A kernel data transfer method and system for transmitting multiple packets of data in a single block of data presented by application programs to the kernel's network subsystem for processing in accordance with data transfer parameters set by the application program. The multi-packet transmit system includes logic that allows header information of the multiple packets of data to be generated in a single buffer and appended to a second buffer containing the data packets to be transmitted through the network stack. The multi-data transmit system allows a device driver to amortize the input/output memory management related overhead across a number of packets. With some assistance from the network stack, the device driver needs to only perform the necessary IOMMU operations on two contiguous memory blocks representing the header information and the data payload of multiple packets during each transmit call.

27 Claims, 9 Drawing Sheets

SYSTEM AND METHOD FOR A MULTI-PACKET DATA LINK LAYER DATA TRANSMISSION

CROSS REFERENCE TO RELATED APPLICATION

This is a continuation-in-part of Masputra et al., U.S. patent application Ser. No.: 10/170,919, filed Jun. 12, 2002, entitled "A SYSTEM AND METHOD FOR A MULTI-DATA NETWORK LAYER TRANSMIT INTERFACE". To the extent not repeated herein, the contents of Masputra et al., are incorporated herein by reference.

FIELD OF THE INVENTION

The present claimed invention relates generally to the field of computer operating systems. More particularly, embodiments of the present claimed invention relate to a system and method for a multi-packet data link layer data transmission.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g., database systems, games, business programs, etc.) define the ways in which these resources are used to solve computing problems. The operating system controls and coordinates the use of the hardware among the various application programs for the various users. In so doing, one goal of the operating system is to make the computer system convenient to use. A secondary goal is to efficiently make use of the hardware.

The Unix operating system (Unix) is currently used by many enterprise computer systems. Unix was designed to be a simple time-sharing system, with a hierarchical file system, which supports multiple processes. A process is the execution of a program and consists of a pattern of bytes that the CPU interprets as machine instructions or data.

Unix consists of two separable parts which include the "kernel" and "system programs." Systems programs typically consist of system libraries, compilers, interpreters, shells and other such programs which provide useful functions to the user. The kernel is the central controlling program that provides basic system facilities. For example, the Unix kernel creates and manages processes, provides functions to access file-systems, and supplies communications facilities.

The Unix kernel is the only part of the Unix operating system that a user cannot replace. The kernel also provides the file system, CPU scheduling, memory management and other operating-system functions by responding to "system-calls." Conceptually, the kernel is situated between the hardware and the users. System calls are the means for the programmer to communicate with the kernel.

System calls are made by a "trap" to a specific location in the computer hardware (sometimes called an "interrupt" location or vector). Specific parameters are passed to the kernel on the stack and the kernel returns with a code in specific registers indicating whether the action required by the system call was completed successfully or not.

Figure 1:
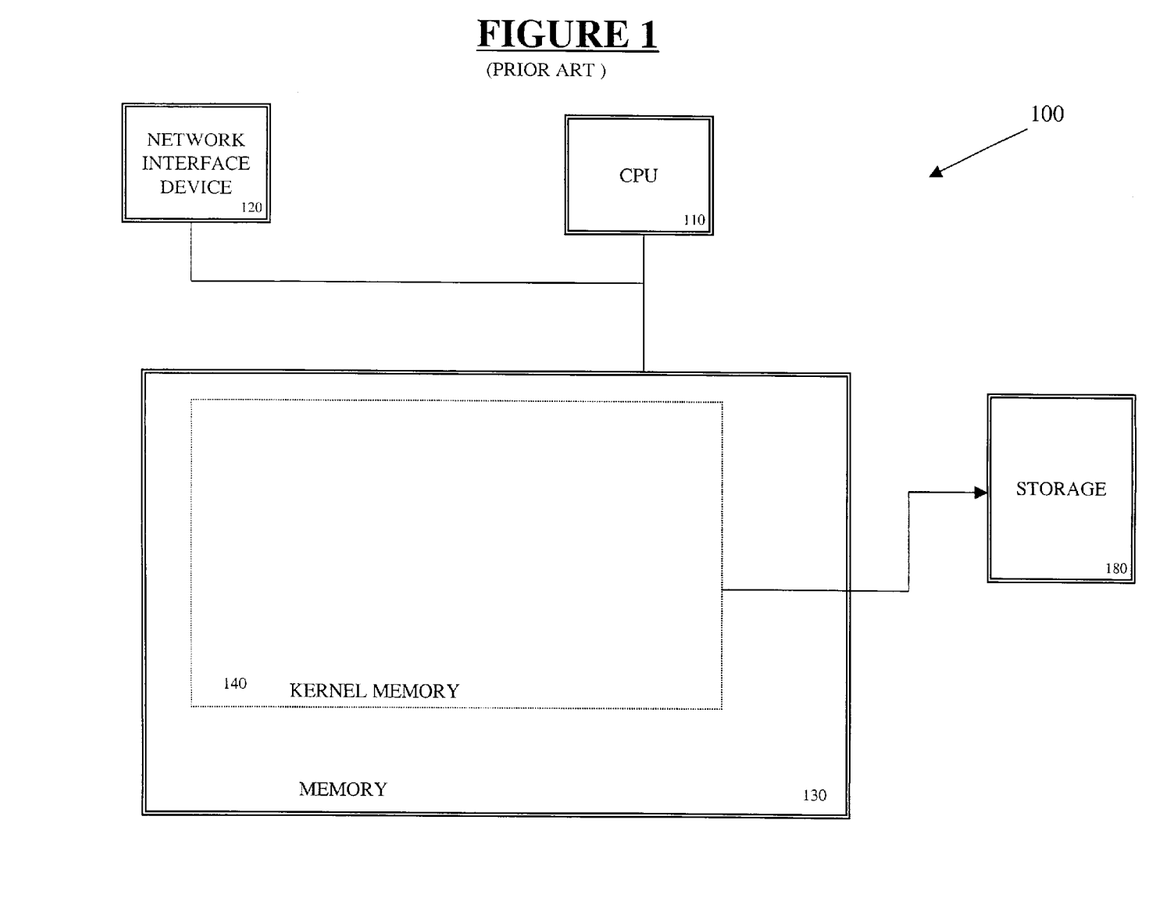
FIG. 1 is a block diagram of a prior art computer system.

FIG. 1 is a block diagram illustration of a prior art computer system 100. The computer system 100 is connected to an external storage device 180 and to an network interface device 120 through which computer programs can be loaded into computer system 100. External storage device 180 and network interface device 120 are connected to the computer system 100 through respective bus lines. Computer system 100 further includes main memory 130 and processor 110. Device 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. During process execution, a programmer programs data structures in the memory at the kernel level memory 140.

The kernel in FIG. 1 comprises a network subsystem. The network subsystem provides a framework within which many network architectures may co-exist. A network architecture comprises a set of network-communication protocols, the protocol from naming conventions for naming communication end-points, etc.

Figure 2:
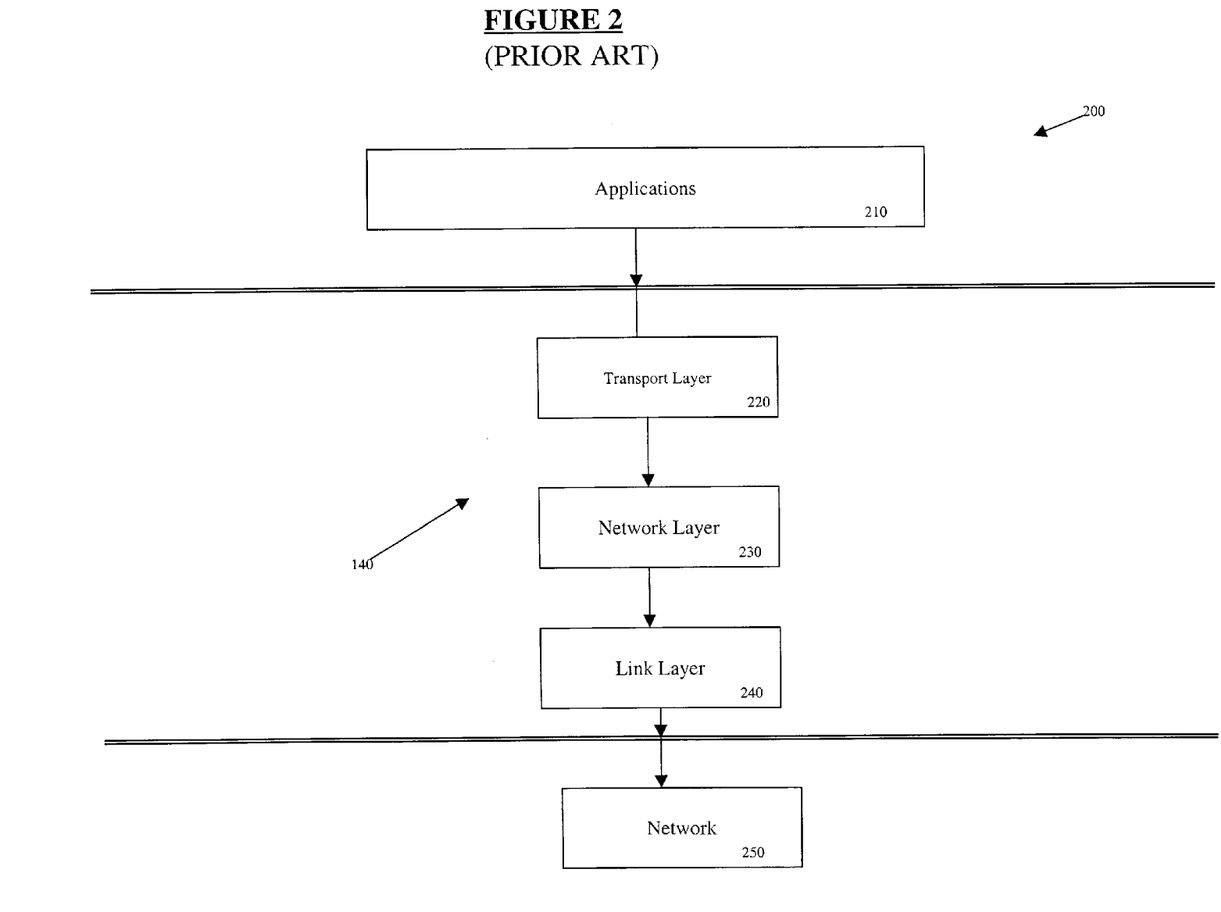
FIG. 2 is a block diagram of software layers of a prior art kernel subsystem.

The kernel network subsystem 140 comprises three logical layers as illustrated in FIG. 2. These three layers manage the following tasks in the kernel: inter-process data transport; internetworking addressing; and message routing and transmission media support. The prior art kernel network subsystem 200 shown in FIG. 2 comprises a transport layer 220, a networking layer 230, and a data link layer 240. The transport layer 220 is the top-most layer in the network subsystem 200.

The transport layer 220 provides an addressing structure that permits communication between network sockets and any protocol mechanism necessary for socket sematics, such as reliable data delivery. The second layer is the network layer 230. The network layer 230 is responsible for the delivery of data destined for remote transport or network layer protocols. In providing inter-network delivery, the network layer 230 manages a private routing database or utilizes system-wide facilities for routing messages to their destination host.

The lowest layer in the network subsystem is the network interface layer 240. The data link layer 240 is responsible for transporting messages between hosts connected to a common transmission medium. The data link layer 240 is mainly concerned with driving the transmission media involved and performing any necessary link-level protocol encapsulation and de-encapsulation.

Figure 3:
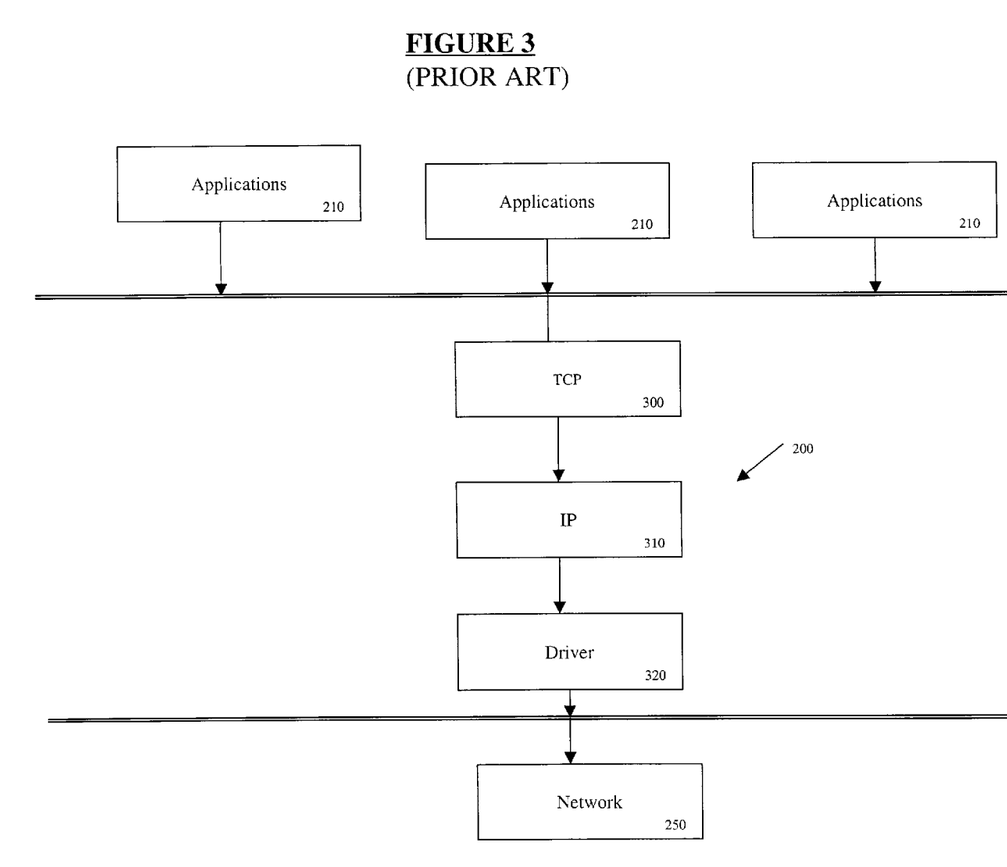
FIG. 3 is a block diagram of software layers of a network subsystem of a prior art kernel.

FIG. 3 is a block diagram of a prior art internet protocol (IP) for the network subsystem 200. Although FIG. 3 describes a IP network subsystem, FIG. 3 is equally applicable to other network protocols, such as Netbios, Appletalk, IPX/SPX, etc. The Internet protocol in FIG. 3 provides a framework in which host machines connecting to the kernel 140 are connected to the network with varying characteristics and the network interconnected with gateways. The Internet protocol illustrated in FIG. 3 is designed for packet switching networks which provide reliable message delivery and notification of failure to pure datagram networks, such as the Ethernet that provides no indication of datagram delivery.

The IP layer 300 is the level responsible for host to host addressing and routing packet forwarding and packet fragmentation and re-assemble. Unlike the transport protocols, it does not always operate on behalf of a socket or the local links. It may forward packets, receive packets for which there are no local socket, or generate error packets in response. The function performed by the IP layer 300 are contained in the packet header. The packet header identifies source and destination hosts and the destination protocol.

The IP layer 300 processes data packets in one of four ways: 1) the packet is passed as input to a higher-level protocol; 2) the packet encounters an error which is reported back to the source; 3) the packet is dropped because of an error or the packet is forwarded along a path to its destination.

The IP layer 300 further processes any IP options in the header, checks packets by verifying that the packet is at least as long as an IP header, checksums the header and discards the packet if there is an error, verifies that the packet is at least as long as the header and checks whether the packet is for the targeted host. If the packet is fragmented, the IP layer 300 keeps it until all its fragments are received and reassembled or until it is too old to keep.

The major protocol of the Internet protocol suite is the TCP layer 310. The TCP layer 310 is a reliable-connection oriented stream transport protocol on which most application protocols are based. It includes several features not found in the other transport and network protocols for explicit and acknowledged connection initiation and termination and includes reliable, in order unduplicated delivery of data, flow control and out-of band indication of urgent data.

The data may typically be sent in packets of small sizes and at varying intervals; for example, when they are used to support a login session over the network. The stream initiation and termination are explicit events after the start and end of the stream, and they occupy positions in a separate space of the stream so that they can be acknowledged in the same manner as the data.

A TCP packet contains an acknowledgement and a window field as well as data, and a single packet may be sent if any of these three changes. A naïve TCP send might send more packets than necessary. For example, consider what happens when a user types one character to a remote-terminal connection that uses remote echo. The server side TCP receives a single-character packet. It might send an immediate acknowledgement of the character. Then milliseconds later, the login server would read the character, removing it from the receive buffer. The TCP might immediately send a window update notice that one additional octet of send window is available. After another millisecond or so, the login server would send an echo character of input.

All three responses (the acknowledgement, the window updates and the data returns) could be sent in a single packet. However, if the server were not echoing input data, the acknowledgement cannot be withheld for too long a time, or the client-side TCP would begin to retransmit.

In the network subsystem illustrated in FIGS. 1-3, the underlying operating system has limited capabilities for handling bulk-data transfer. For many years, there has been an attempt in formulating the network throughput to directly correlate to the underlying host CPU speed, i.e., 1 megabit (Mbps) network throughput per 1 megahertz (MHz) of CPU speed. Although such paradigms may have been sufficient in the past for low bandwidth network environment, they may not be adequate for today's high-speed networking mediums, where bandwidths specified in units of gigabit per second (Gbps) are becoming increasingly common and create a tremendous overhead processing cost for the underlying network software.

Networking software overhead can be classified into per-byte and per-packet costs. Prior analysis of per-byte data movement cost in prior art operating system networking stacks show that data copy function and checksum overhead function dominate host CPU processing time. Other analysis of the per-packet cost has revealed that the overhead associated with some prior art operating systems is as significant as the per-byte costs.

Figure 4:
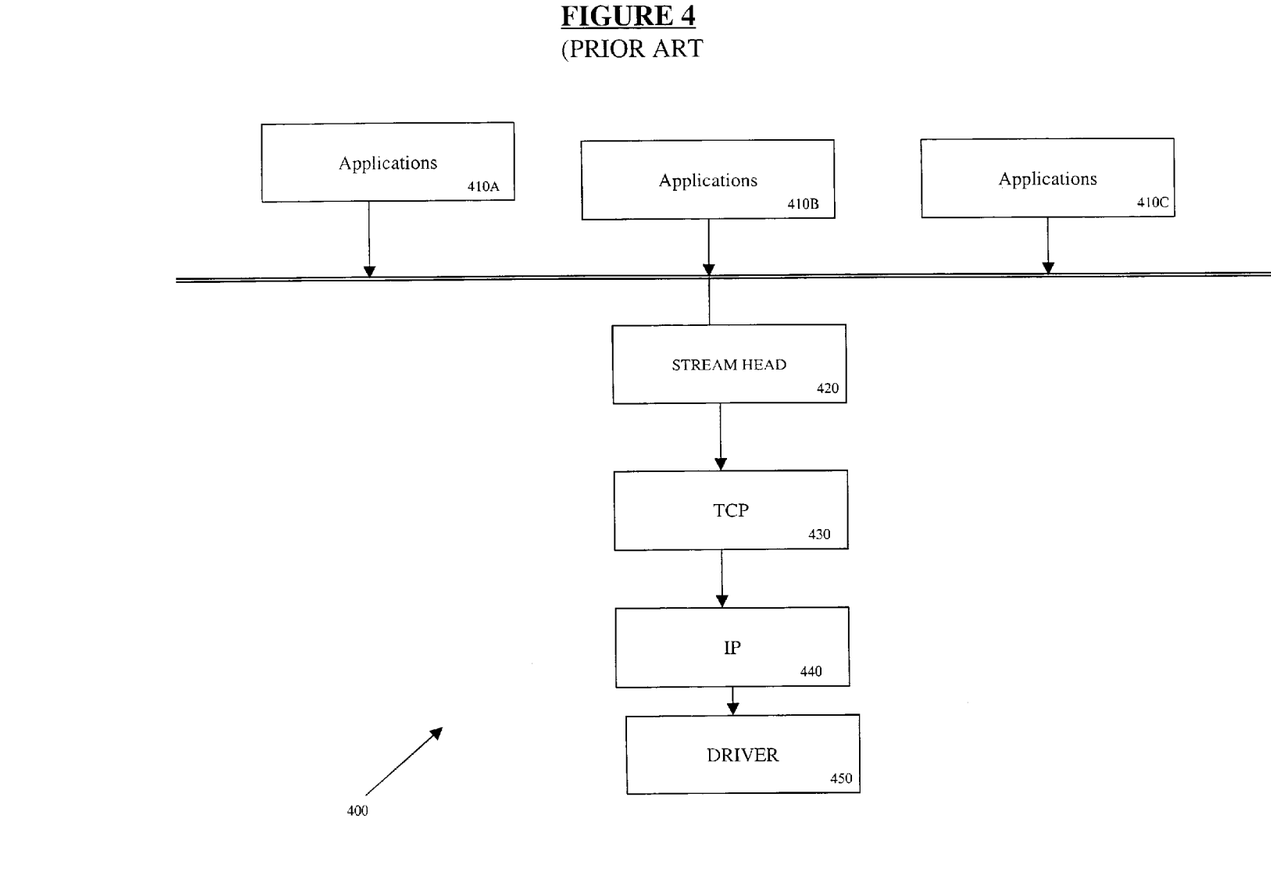
FIG. 4 is a block diagram of software layers of a prior art network module of a prior art kernel.

In analyzing the prior overhead costs of processing and transmitting data in the kernel's network subsystem, FIG. 4 is a prior art illustration of a kernel network subsystem 400 having a stream head module 420 for generating network data for transmission in the network subsystem 400. The header module 420 is the end of the stream nearest the user process. All system calls made by user-level applications on a stream are processed by the header module 420. The stream head module 420 typically copies the application data from user buffers into kernel buffers, and during the copying process, it may provide the data into small chunks, based on the header and data payload. The stream head module 420 may also reserve some extra space in front of each allocated kernel buffer depending on the static packet value.

Currently, the TCP module 430 utilizes these parameters in an attempt to optimize the transmit dynamics and reduce allocation cost for the TCP/IP and link-layer headers in the kernel. By setting the data packet to a size large enough to hold the headers while setting the data to a maximum TCP segment size, the TCP module 430 effectively instructs the stream head module 420 to divide the application data into two kernel buffers for every system call to the TCP module 430 to transmit a single data packet.

For applications which transmit bulk data, it is not uncommon to see buffer sizes in the range of 32 KB, 64 KB, or larger. Applications typically inform the TCP module 430/IP module 440 of this size in order for the modules to configure and possibly optimize the transmit characteristics, by configuring the send buffer size. Ironically for the TCP module 430, this strategy has no effect in optimizing the stream head module 420 behavior, due to the fact that the user buffer is broken up into maximum segment size (MSS) chunks that the TCP module 430 can handle.

For example, a 1 MB user buffer written to the socket causes over 700 kernel buffer allocations in the typical 1460-bytes MSS case, regardless of the size. This method is quite inefficient, not only because of the costs incurred per allocation, but also because the application data written to the socket cannot be kept in larger contiguous chunks.

In the prior art systems shown in FIGS. 1-4, a socket's packet processing consists of the header 420, the transport module 430, the network module 440 and the driver 450. Application data residing in the kernel buffers are sent down through each module's queue via a STREAMS framework. The framework determines the destination queue for the message, hence providing a sense of abstraction between the modules.

In the system shown in FIG. 4, data is a contiguous block of memory which is divided into small chunks of data that could be transmitted to a link partner and re-assembled to reproduce a copy of the original data. The number of times that the data packet is divided up depends on how many layers the data goes through. Each layer through which the data is transmitted adds a header to the chunk to facilitate the reception and re-assembly on the link partner. The sub-division of the data and appending headers for each layer can become costly when data gets to the data link provider interface (DLPI) layer. The DLPI layer is only designed to send one packet at a time. If the original data block is left intact and the headers are built on a second page, it may be possible to give the hardware two blocks of memory, header memory and a payload memory. However, assembling the data chunks can still prove to be costly.

Figure 5:
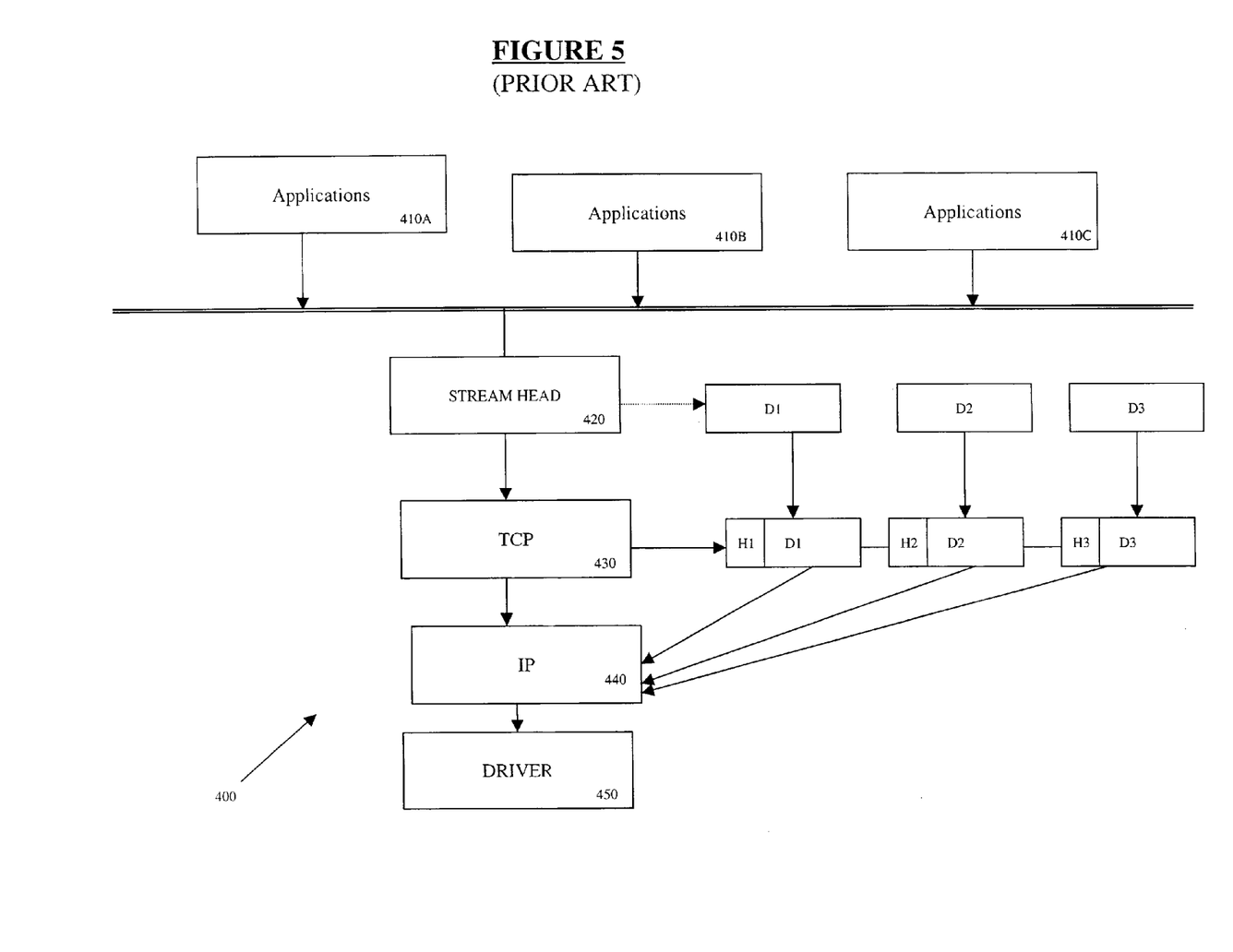
FIG. 5 is a block diagram of a prior art packet handling between the TCP and IP modules of FIG. 4.

One prior art solution to the large processing overhead cost of handling bulk data transmission is the implementation of a hardware large send offload feature. The large send offload is a hardware feature implemented by prior art Ethernet cards that virtualize the link maximum transmission unit, typically up to 64 KB from the network stack. This enables the TCP/IP modules to reduce per-packet costs by the increased virtual packet size. Upon receiving the jumbo packet from the networking stack, the NIC driver instructs the on-board firmware to divide the TCP payload into smaller segments (packets) whose sizes are based on the real TCP MSS (typically 1460 bytes). Each of these segments of data is then transmitted along with the TCP/IP header created by the firmware, based on the TCP/IP header of the jumbo packet as shown in FIG. 5.

Although this prior art solution substantially reduces the per-packet transmission costs, it does not provide a practical solution because this solution is exclusively tailored for TCP and depends on the firmware's ability to correctly parse and generate the TCP/IP headers (including IP and TCP options). Additionally, due to the virtual size of the packets, many protocols and/or technologies which operate on the real headers and payload, e.g., IPsec will cease to function. It also breaks the TCP processes by luring the TCP module 430 into using larger maximum transmission unit (MTU) compared to the actual link MTU. Since the connection endpoints have a different notion of the TCP MSS, it inadvertently brings harm to the congestion control processes used by TCP. Doing so would introduce unwanted behavior, such as high rate of retransmissions caused by packet drops.

The packet chaining data transmissions of the prior art system therefore require data to be transmitted through the network subsystem in small packets. Also required are the creation of individual headers to go with each packet that requires the sub-layers of the network subsystem to transmit pieces of the same data, due to the fixed packet sizes, from a source to a destination host. Such transmission of data packets is not only time consuming and cumbersome, but very costly and inefficient. Supporting protocols other than TCP over plain IP would require changes made to the firmware which in itself is already complicated and poses a challenge for rapid software development/test cycles. Furthermore, full conformance to the TCP protocol demands that some fundamental changes to operating system networking stack implementation, where a concept of virtual and real link MTU is needed.

SUMMARY OF INVENTION

Accordingly, to take advantage of the many application programs available and the increasing number of new applications being developed and the requirement of these new applications for fast network bandwidth, a system is needed that optimizes data transmission through a kernel network subsystem. Further, a need exists for solutions to allow for the multi-packet transfer of data in a computer system without incurring the costly delay of transmitting each piece of data with an associated header information appended to the data before transmitting the data. A need further exists for an improved and less costly method of transmitting data without the inherent prior art problems of streaming individual data packet headers with each data transmitted in the network subsystem. A need further exists for a data link provider interface layer extension primitive that is flexible and scalable to send batches of data packets or split header and payload packets for transmission to requesting network devices.

What is described herein is a computer system having a kernel network subsystem that provides a mechanism and a technique for providing a multipacket data transfer from applications to the network subsystem of the kernel without breaking down the data into small data packets. Embodiments of the present invention allow programmers to optimize data flow through the kernel's network subsystem on the main data path connection between the transport connection protocol and the Internet protocol suites of the kernel.

Embodiments of the present invention allow multi-packet data sizes to be dynamically set in order to avoid a breakdown of application data into small sizes prior to being transmitted through the network subsystem. In one embodiment of the present invention, the computer system includes a kernel transport layer transmit interface system that includes optimization logic for enabling code that enables kernel modules to transmit multiple packets in a single block of application data using a bulk transfer of such packets without repetitive send and resend operations. In one embodiment, the present invention enables header information from the multiple packets of data to be separated from the corresponding payload information for transmission to a requesting network device.

The multi-packet transmit logic further provides a programmer with a number of semantics that may be applied to the extension data along with the manipulation interfaces that interact with the data. The transport layer transmit interface logic system of the present invention further allows the data packetizing to be implemented dynamically according to the data transfer parameters of the underlying kernel application program.

Embodiments of the present invention further include packet information logic that processes information required to access header and payload data in each packet block. The packet information logic includes offsets and packet length information which may be used in conjunction with header area base address and payload area base address information that is required to load a request to the network device.

Embodiments of the present invention also include packet offload information logic that provides offload types and corresponding offsets that are implemented as pointers to the next offload in the multi-packet data block. The packet offload information comprises offload offset information that enables offloads from the packets to be multi-threaded for transmission. These offloads also allow for one's complement checksumming, internet protocol checksumming, etc., of the multi-packet data block.

Embodiments of the present invention further include layer 2 addressing logic. The layer 2 addressing logic allows the multi-packet transmission unit of the present invention to transmit the header and payload information of the multi-packet data block as layer 2 addressing packets. The format of the layer 2 address is given by the DLPI specification which allows the layer 2 address to apply to all the packets in the multi-packet data block in a particular request.

Embodiments of the present invention further include data linking logic for linking the header and segment data buffers together to define the single data block representing an array of packets to be transmitted each transmission cycle.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process multiple data packets in a computer system that may be applicable to an operating system kernel. In accordance with an aspect of the invention, a multi-packet data transmission optimization system provides a programmer the ability to dynamically transmit multiple packets of application program data in a single bulk transmission in the transport layer of the kernel from a computer applications program over a computer network to a host device.

Figure 6:
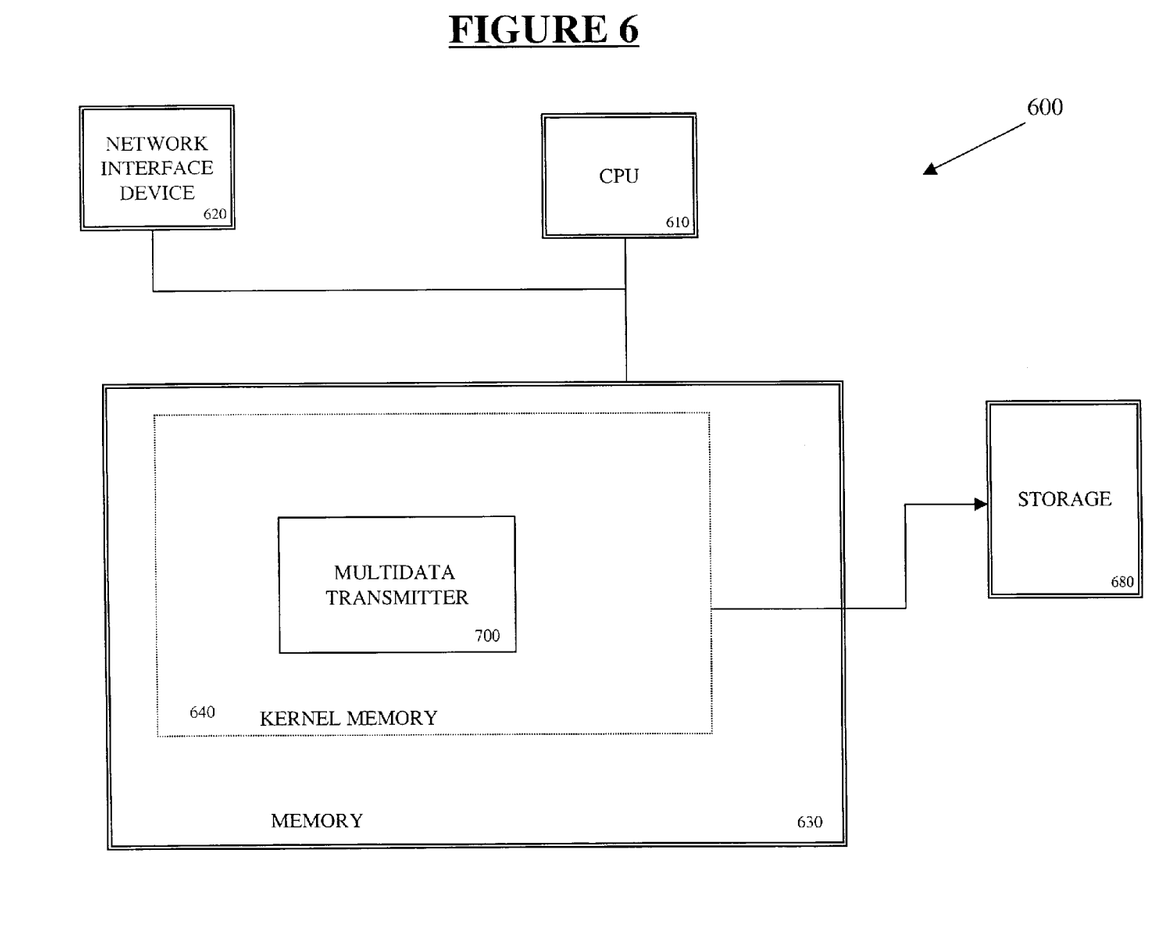
FIG. 6 is a block diagram of a computer system of one embodiment of the present invention.

FIG. 6 is a block diagram illustration of one embodiment of a computer system 600 of the present invention. The computer system 600 according to the present invention is connected to an external storage device 680 and to a network interface drive device 620 through which computer programs according to the present invention can be loaded into computer system 600. External storage device 680 and drive device 620 are connected to the computer system 600 through respective bus lines. Computer system 600 further includes main memory 630 and processor 610. Drive 620 can be a computer program product reader such a floppy disk drive, an optical scanner, a CD-ROM device, etc.

FIG. 6 additionally shows memory 630 including a kernel level memory 640. Memory 630 can be virtual memory which is mapped onto physical memory including RAM or a hard drive, for example, without limitation. During process execution, data structures may be programmed in the memory at the kernel level memory 640. According to the present invention, the kernel memory level includes a multi-data transmission module (MDT) 700. The MDT 700 enables a programmer to optimize data packet flow through the transport layer of the network subsystem of the kernel 640.

Figure 7:
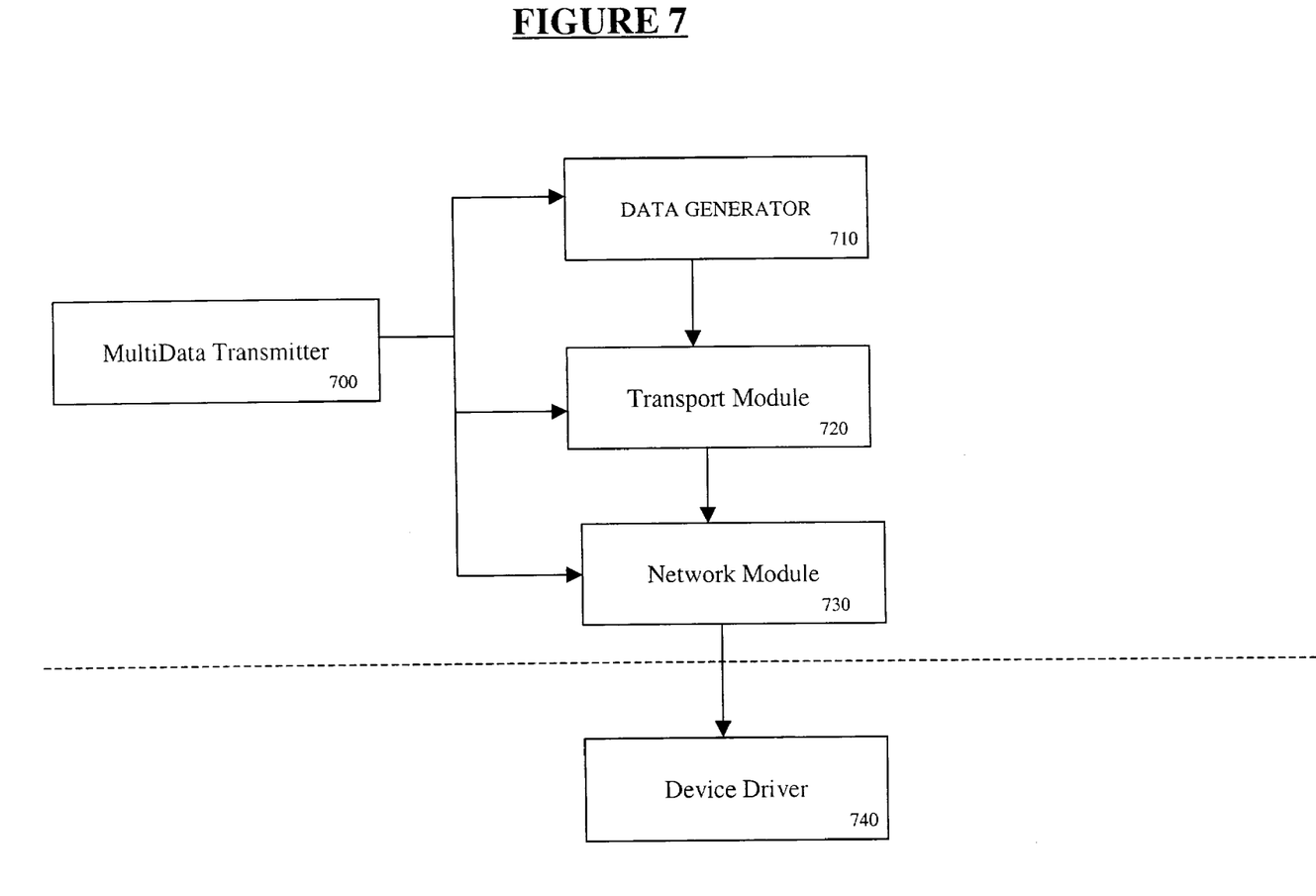
FIG. 7 is a block diagram of an exemplary network subsystem with an embodiment of the multi-data transmitter of the kernel subsystem in accordance an embodiment of the present invention.

FIG. 7 is an exemplary block diagram illustration of one embodiment of the network subsystem with the MDT 700 of the kernel memory space of the present invention. The exemplary kernel memory space comprises MDT 700, kernel data generation module 710, transport module 720, network module 730 and device driver 740. The data generation module 710 provides the STREAM configuration for the present invention. The data generation module 710 generates multiple segments of data representing a single block of application data in response to multi-data transmit requests from the transport module.

The transport module 720 optimizes the performance of the main data path for an established connection for a particular application program. This optimization is achieved in part by the network module 730 knowledge of the transport module 720, which permits the network module 730 to deliver inbound data blocks to the correct transport instance and to compute checksums on behalf of the transport module 720. Additionally, the transport module 720 includes logic that enables it to substantially reduce the number of acknowledgment overheads in each data block processed in the network sub-system. In one embodiment of the present invention, the transport module 720 creates a single consolidated transport and network headers for multiple outgoing packets before sending the packets to the network module 730.

The network module 730 is designed around its job as a packet forwarder. The main data path through the network module 730 has also been highly optimized for both inbound and outbound data blocks to acknowledge and filly resolve addresses to ports the transport layer protocols have registered with the network module 730.

The network module 730 computes all checksums for inbound data blocks transmitted through the network subsystem. This includes not only the network header checksum, but also, in the transport cases. In one embodiment of the present invention, the network module 730 knows enough about the transport module 720 headers to access the checksum fields in their headers. The transport module 720 initializes headers in such a way that the network module 730 can efficiently compute the checksums on their behalf.

The multi-data transmitter 700 provides an extensible, packet-oriented and protocol-independent mechanism for reducing the per-packet transmission over-head associated with the transmission of large chunks of data in the kernel's network subsystem. In one embodiment of the present invention, the MDT 700 enables the underlying network device driver to amortize the input/output memory management unit (IOMMU) related overhead across a number of data packets transmitted in the kernel.

By reducing the overhead cost, the device driver needs to only perform the necessary IOMMU operations on two contiguous memory blocks representing the header information associated with the transmitted block of data comprising multiple packets of data. In one embodiment of the present invention, the MDT 700 with the assistance of the kernel's networking stack performs only the necessary IOMMU operations on the two contiguous memory blocks representing the header buffer and the data payload buffer during each transmit call to the transport module 720.

The MDT 700 achieves this by instructing the data generation module 710 to copy larger chunks of the application data into the kernel's buffer. In one embodiment of the present invention, the MDT 700 avoids having dependencies on the underlying network hardware or firmware. The MDT 700 further avoids changing the data generation framework of the data generation module 710 to minimize the potential impact on the stability and performance of the underlying operating system. The MDT 700 advantageously provides a mechanism to increase network application throughput and achieve a better utilization of the host computer's CPU without having to modify the underlying operating system.

Figure 8:
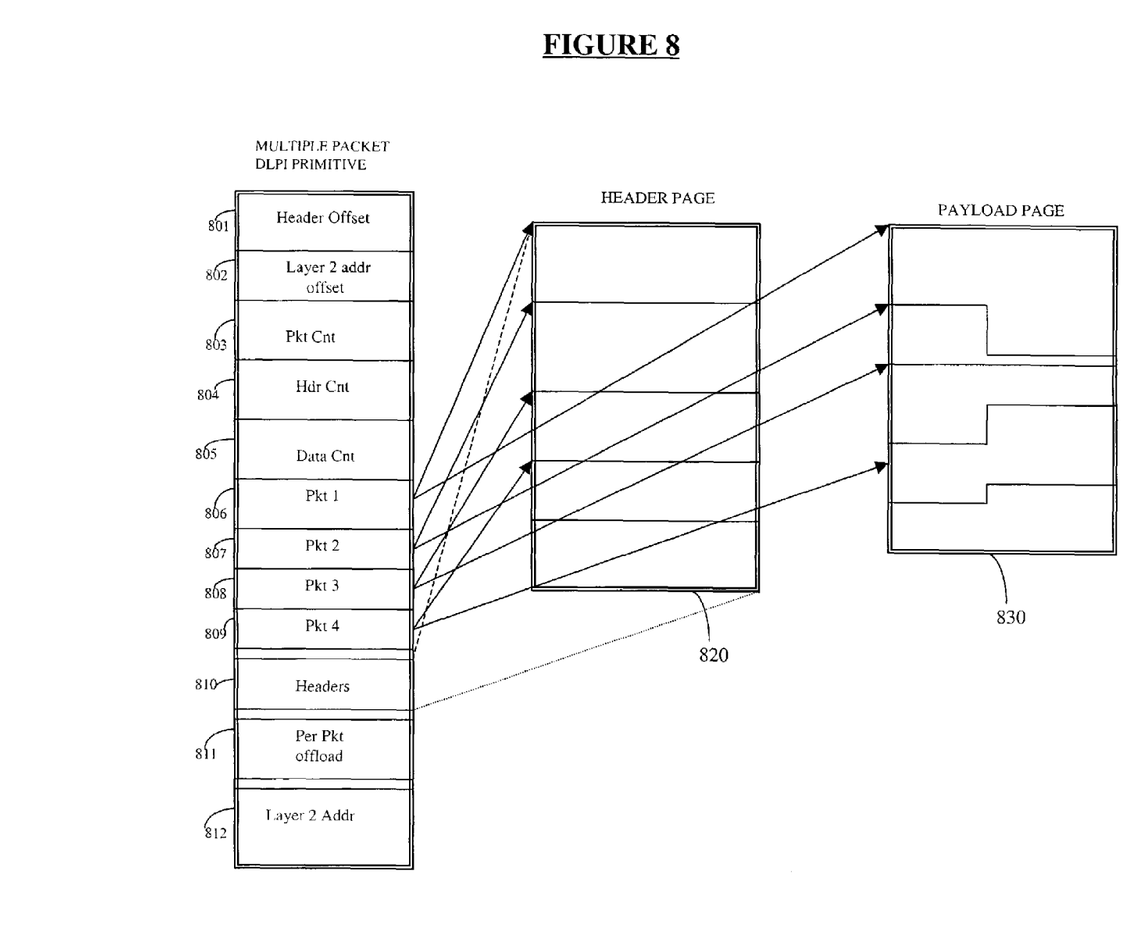
FIG. 8 is a block diagram packet organization of one embodiment of the present invention.

FIG. 8 is a block diagram illustration of one embodiment of a data request of one embodiment of the multi-packet transmission unit 700 of the present invention. As shown in FIG. 8, a multiple data request comprises a data request primative structure 800, header page 820 and payload page 830.

The data request primitive 800 contains all the information required to transmit headers and payload information as regular layer 2 packets. The data primative 800 is a data structure that is passed by the MDT 700 to the data link device that utilizes multi-data transmission capability. The data link driver uses the information provided in the data structure to inform the hardware of the location and length of headers and payloads with the multi-data buffers. This allows the hardware to piece together the data packets into Ethernet packets to the physical link.

The data request primative 800 comprises header offset information 801, an array of per packet information 802-809, optional stack headers 810, per packet offload information 811 and layer 2 addressing 812. Associated with the multiple packet primative 800 is header page 820 and payload page 830.

In one embodiment of the present invention, the multi-packet data transmission unit 700 comprises of one main memory region. In this embodiment, the headers are implemented within the memory region containing the multi-packet data primative 800. Furthermore, the headers can be packets accumulated for one multi-packet call in which case the payload section 820 is optional. In another embodiment, the payload section 820 is not an optional implementation. And in this case, groups of packets are packed into the payload 820 for transmission in a single transmission cycle.

The header page 820 originates in the top layer of the kernel's networking subsystem protocol stack and it is used to build the packet headers for a transmission. The implementation of the packet headers in the header page 820 is protocol development dependent. This allows the protocol developer to determine how to build the packets in the header page 820. The payload page 830 is fragmented as per each layer's requirements and the headers maintain that information throughout the transmission cycle.

The payload 830 has two origins. One is at the application layer and the other is within the kernel. The payload 830 that originates at the application layer ends up in the kernel due to an IOMMU operation making it visible to the kernel. Alternatively, a second in kernel payload page is created and the original is copied into it. Once in the kernel space the payload is broken into link layer packet sizes and transmitted. Alternatively, the payload 830 may be transmitted as a collection of large packets in which the headers 820 are incorporated as part of the payload 830 section. In this embodiment, the payload is associated with a multi-packet primative 800.

Figure 9:
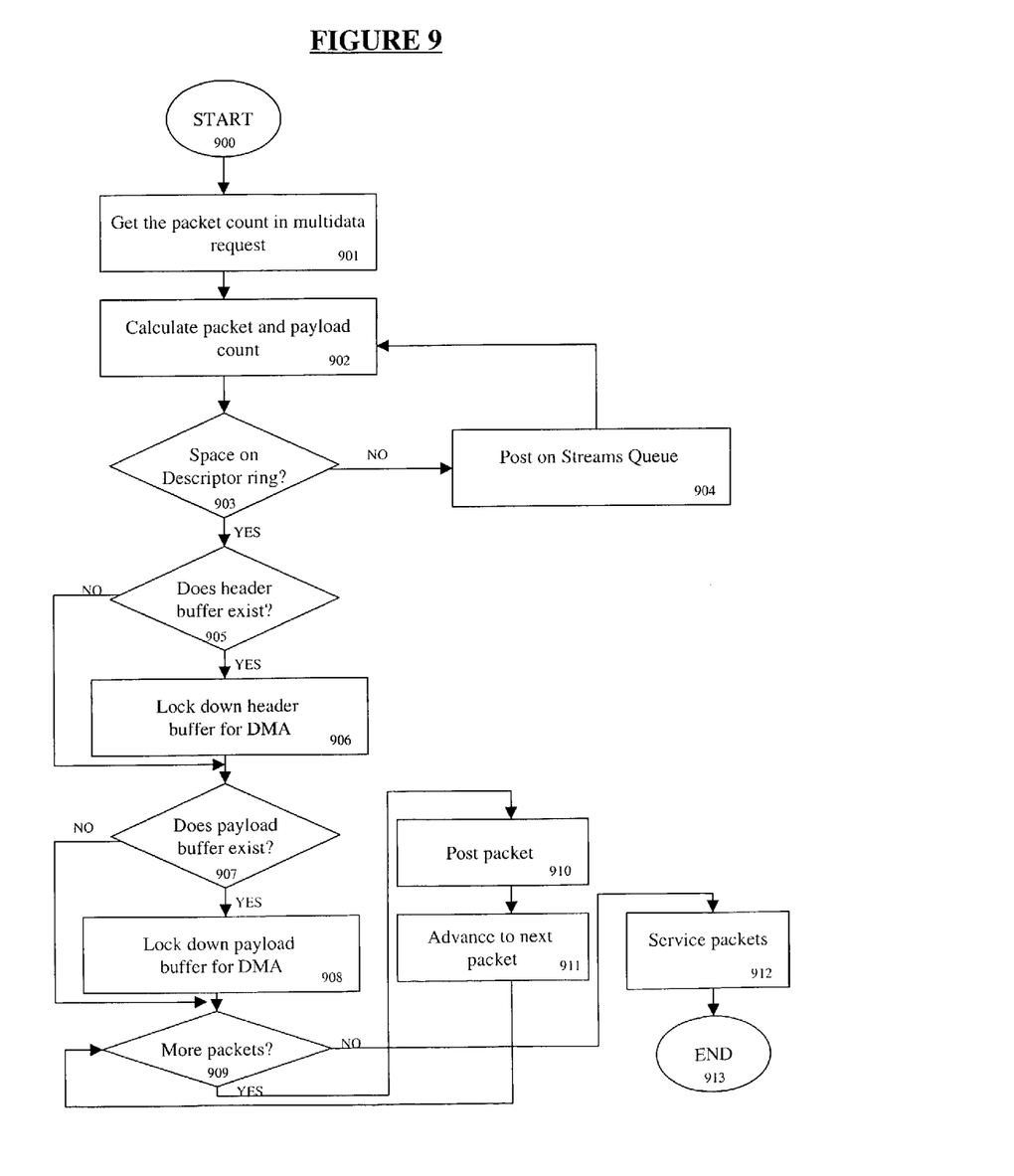
FIG. 9 is a flow diagram of a method of a multi-packet transmission through the network layer of the kernel subsystem of one embodiment of the present invention.

FIG. 9 is a flow diagram of one embodiment of a computer implemented multi-data transmit packet processing of the present invention. As illustrated in FIG. 9, a multi-data transmit processing commences 900 when the MDT 700 retrieves a packet count in a multi-data request presented to the MDT 700 at step 901. At step 902, the number of transit descriptors required to complete a request is calculated from the packet header 820 and payload count 830.

At step 903 the MDT 700 determines whether there is enough space on the data link layer descriptor ring to handle the number of packets presented in a particular request. If there is enough space on the descriptor ring, processing continues at step 905. If the descriptor ring does not have enough space to handle packets in a transmit request, processing continues at step 904 where the request is posted in a streams queue for a transmit retry.

At step 905, the MDT 700 determines whether a request ready to be posted on a descriptor ring has a header buffer in the packet information. If the header buffer exists, processing continues at step 906 where the header buffer is locked downed for a direct memory access. If, on the other hand, the packet header buffer does not exist, processing continues at step 907 where the packet is checked to determine whether a payload buffer is included in the packet information.

At step 908, if the packet information contains a payload buffer, the payload buffer is locked down for a direct memory access. At step 909, the MDT 700 determines whether there is more packets to be processed from the request and if there are no more packets to be processed, the network is informed to service the packets just posted to the descriptor ring at step 912.

At step 910 the processed packet with the header and payload buffers is posted in the descriptor ring to be transmitted. At step 911, the next packet in the transmit request is processed and the MDT 700 advances to the next packet on the multi-data descriptor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer network system, comprising:
a processor;
a plurality of network devices;
a device driver;
a transport module to create a single consolidated transport header for multiple data packets;
an operating system kernel comprising a multi-packet transmission system to transmit the multiple data packets in a single transmission cycle to a network device coupled to the computer system in a single system call to a data link layer in said operating system kernel, a data size of each of the multiple data packets is dynamically set according to data transfer parameters of the underlying kernel application program to avoid a breakdown of application data into maximum segment size data packets determined by a TCP module prior to being transmitted through a network subsystem,
wherein, the multi-packet transmission system comprising a contiguous block of a plurality of header information with associated payload data information defines the single consolidated transport header in a single buffer and appended to a second buffer containing the data packets to be transmitted through a network stack.

2. The computer system of claim 1, wherein said multi-packet transmission system comprises an array of packet information logic modules for storing information required to access header and payload information in each packet.

3. The computer system of claim 2, wherein said multi-packet transmission system further comprises a packet stack header logic module.

4. The computer system of claim 3, wherein said multi-packet transmission system further comprises a packet offload logic module for defining device offload types for the multi-packet transmission system.

5. The computer network system of claim 4, wherein said multi-packet transmission system further comprises a layer 2 addressing logic module for transmitting said multiple packet data as layer 2 addressing packets.

6. The computer network system of claim 2, wherein said packet information logic modules comprise header length information for defining space to set aside in main memory from the beginning of a current packet header to the beginning of the current layers header to enable the multi-packet transmission system to traverse a protocol stack in said network system.

7. The computer network system of claim 6, wherein said packet information logic modules further comprise packet tail length information for defining space set aside said main memory, from the end of a current layer header to the end of the space set aside for the current packet header.

8. The computer network system of claim 7, wherein said packet information logic modules further comprise packet header offset information for defining header offset information relative to the base of the header buffer for calculating header input/output address posted to said network device for the current packet to be fetched by said network device and transmitted.

9. The computer network system of claim 8, wherein said packet information logic modules further comprise packet header length information for defining a total length of all headers for a particular packet.

10. The computer network system of claim 9, wherein said packet information logic modules further comprise offload offset information for defining a staffing offset for a list of per packet offloads.

11. The computer network system of claim 4, wherein said packet offload logic modules comprise an offload type for defining a parameter type of an offload a driver and a hardware device is expected to provide to said multi-packet transmission system.

12. An operating system kernel in a computer network, comprising:
a network subsystem;
a plurality of network devices;
a transport module to create a single consolidated transport header for multiple data packets in a multi-packet data block and for processing the multi-packet data block in a single transport cycle; and
a network module to compute checksums the multi-packet data block;
a multi-packet transmission module comprising a contiguous block of a plurality of header information with associated payload data information for transmitting said multi-packet data block as a single data transmission block in a single system call from said operating system kernel to a requesting one of said plurality of network devices, a data size of each of the multiple data packets is dynamically set according to data transfer parameters of the underlying kernel application program to avoid a breakdown of application data into maximum segment size data packets determined by a TCP module, prior to being transmitted through a network subsystem, wherein the multi-packet transmission module causes the single consolidated transport header information of data packets to be generated in a single buffer and appended to a second buffer containing the data packets to be transmitted through a network stack.

13. The operating system kernel of claim 12, wherein said multi-packet transmission module further comprises a packet offload logic module for defining device offload types for the multi-packet transmission system.

14. The operating system kernel of claim 13, wherein said multi-packet transmission module further comprises header length information for defining space to set aside in main memory from the beginning of a current packet header to the beginning of the current layers header to enable the multi-packet transmission system to traverse a protocol stack in said network system.

15. The operating system kernel of claim 14, wherein said packet information logic module further comprises packet tail length information for defining a space set aside in said main memory from the end of a current layer header to the end of the space set aside for the current packet header.

16. The operating system kernel of claim 15, wherein said packet information logic module further comprises packet header offset information for defining header offset information relative to the base of the header buffer for calculating header input/output address posted to said network device for the current packet to be fetched by said network device and transmitted.

17. The operating system kernel of claim 16, wherein said packet information logic module further comprises packet header length information for defining a total length of all headers for a particular packet.

18. The operating system kernel of claim 17, wherein said packet information logic module further comprises offload offset information for defining a staffing offset for a list of per packet offloads.

19. The operating system kernel of claim 18, wherein said packet offload logic module comprises an offload type for defining the parameter type of an offload that a driver and a hardware device is expected to provide to said multi-packet transmission system.

20. A computer implemented multi-data request transmission system comprising:
data request primitive structure logic comprising information for transmitting header and payload information associated with a multi-packet data transmission request into layer 2 addressing packets, the information for transmitting header and payload include a packet header offset information for defining header offset information relative to the base of a header buffer for calculating header input/output address, and pointers to each of a plurality of data packets in the payload;
payload data logic for providing payload data information associated with each packet in said multi-packet data transmission request; and
packet header information logic for providing header information associated with each of said multi-packet data transmission requests, the header information includes a contiguous block of a plurality of header information with associated payload data information and a header length information for defining space to set aside in main memory from a beginning of current packet header to a beginning of a header of current layer to enable the multi-packet transmission system to traverse a protocol stack in the network system.

21. A system as described in claim 20 wherein said multi-data request transmission system further comprises a data buffer for storing a plurality of packets of data transmitted in a single transmission cycle to said network devices.

22. A system as described in claim 21 wherein said data is a kernel data structure of a computer operating system.

23. A system as described in claim 22 wherein application programs in said computer system are aware of said data buffer for said data structure.

24. A method of transmitting multiple packets in a computer system network to a network device in a single call to a data link layer in said computer network, the method comprising:

allocating a master block for a data payload to create a payload page that includes a plurality of payload data;

allocating header information and associated block data, the header information includes a contiguous block of a plurality of header information for the plurality of payload data and a header offset information relative to a base of a header buffer for calculating header input/output address;

generating header-payload pairs by linking said header information to a payload data, wherein the header information includes pointers to each of the plurality of payloads;

allocating a multi-data transmit descriptor and an associating memory block;

generating a contiguous data block corresponding to said multiple packets; and     transmitting said multi-packet data block to said device driver.

25. The method of claim 24, wherein said transmitting said multi-packet data block comprises generating duplicate network protocol stack messages to said network device.

26. The method of claim 25, wherein said transmitting said multi-packet data block further comprises locking down said header and payload information for a direct memory access in said computer network.

27. The method of claim 26, wherein said transmitting said multi-packet data block further comprises updating said network protocol stack with said header-payload pairs until said multi-data request is completely transmitted.

* * * * *